United States Patent Office 3,519,678
Patented July 7, 1970

3,519,678
HALO-SUBSTITUTED 2-ACETOXY
BENZANILIDES
Keith John Farrington, Gymea Bay, New South Wales,
Australia, assignor to Parke, Davis & Company, Detroit, Mich., a corporation of Michigan
No Drawing. Filed Mar. 31, 1966, Ser. No. 538,956
Claims priority, application Australia, Apr. 1, 1965,
57,125/65
Int. Cl. C07c *103/30*
U.S. Cl. 260—479        7 Claims

ABSTRACT OF THE DISCLOSURE 2-acyloxylbenzanilides, substituted in the 3- and 5-positions by bromine or iodine, and also, either in the 4'-position by chlorine, bromine, or iodine or in the 3'-position by trifluoromethyl, and their production by (a) reacting a correspondingly substituted salicylanilide with a reactive derivative of an alkanoic acid, or (b) reacting a 3,5-dihalo-2-acyloxybenzoyl halide with a suitably substituted aniline compound. The compounds are useful as antiparasitic agents that are active against the trematode *Fasciola hepatica* and a variety of nematodes, for example, *Haemonchus contortus*.

SUMMARY AND DETAILED DESCRIPTION

The present invention relates to new halogen-containing benzanilide compounds and to methods for their production. More particularly, the invention relates to new halogen-containing 2-acyloxybenzanilide compounds having the formula

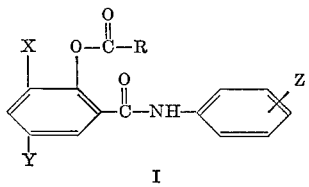

I where R is hydrogen, a straight-chain or branched-chain alkyl radical having from one to 17 carbon atoms, a cycloalkyl group having from 3 to 8 carbon atoms, or a cycloalkyl-substituted alkyl radical; each of X and Y is bromine or iodine; and Z is a p-chloro, p-bromo, p-iodo, or m-trifluoromethyl substituent. Some examples of groups represented by R in the above formula are methyl, ethyl, isopropyl, n-pentyl, n-pentadecyl, cyclopropyl, cyclohexyl, and 2-cyclopentylethyl. The preferred R group is methyl.

In accordance with the invention, halogen-containing 2-acyloxybenzanilide compounds having the foregoing formula are produced by the reaction of a halogen-containing salicylanilide compound having the formula

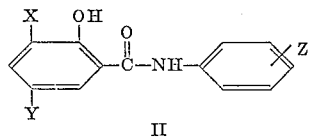

II with a reactive derivative of an alkanoic acid having the formula

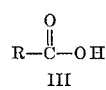

III where R, X, Y, and Z have the aforementioned significance. Suitable reactive derivatives of the acid of Formula III that may be used for this purpose are the acid anhydride and an acid halide. When the acid anhydride is employed, it is preferable to add to the reaction mixture an acidic catalyst, such as sulfuric acid or p-toluenesulfonic acid. When an acid halide, preferably an acid chloride, is used, a tertiary amine catalyst, such as triethylamine, dimethylaniline, or pyridine is used in an amount sufficient to bind the hydrohalic acid liberated. The reaction may advantageously be carried out in an unreactive solvent medium. Suitable solvents for this purpose are ethers, such as diethyl ether, ethylene glycol dimethyl ether, dioxane, and tetrahydrofuran; aliphatic hydrocarbons, such as isooctane; aromatic hydrocarbons, such as benzene, toluene, and xylene; chlorinated hydrocarbons, such as chlorobenzene, trichloroethane, carbon tetrachloride, and chloroform; and other unreactive solvents such as N,N-dimethylformamide and dimethylsulfoxide. In the reaction with an acid halide, an excess of the tertiary amine catalyst may be used, and additional solvent may be omitted. Added solvent may also be omitted in the reaction with the acid anhydride if a several-fold excess of the anhydride is employed. The temperature and duration of the reaction are not critical, and may be varied over a wide range, depending on the reactant and solvent employed. The preferred temperature range for an acid halide reactant is 15–50° C., while for the acid anhydride the preferred range is 25–75° C. when an acid catalyst is added, and 40–150° C. in the absence of such a catalyst. With either reactant under the preferred temperature conditions, the reaction is substantially complete in 1 to 3 hours, although a longer period, up to 24 hours, may also be used. Equivalent amounts of reactants may be employed; to insure complete reaction, however, it is preferable to use an excess of the reactive derivative of the alkanoic acid of Formula III.

The halogen-containing salicylanilide compounds having Formula II, which are used as starting materials in the foregoing procedure, can generally be prepared by the reaction of a halogen-containing salicylic acid compound having the formula

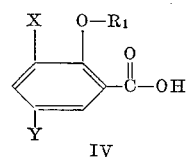

IV with an aniline compound having the formula

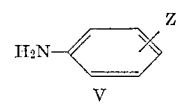

V in the presence of phosphorus trichloride; where $R_1$ is hydrogen or acetyl, and X, Y, and Z are as defined earlier. An alternative method, which is preferred for the preparation 3,4',5-triiodosalicylanilide, is the reaction of a halogen-containing salicyclic acid halide compound having the formula

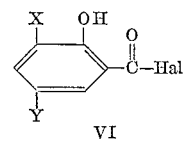

VI with at least two molar equivalents of the aniline compound having Formula V above in an unreactive solvent medium, such as benzene or toluene; where Hal is a halogen atom, preferably chlorine, and X and Y are as defined previously. The halogen-containing salicyclic acid compounds having Formula IV above where one of X and Y is iodine and the other is bromine can be prepared by the reaction of the appropriate monobromosalicyclic acid compound with iodine monochloride in a polar solvent medium, such as acetic acid. The halogen-containing salicyclic acid halide compounds having Formula VI can then be prepared from the acid compounds of Formula IV by reaction with a suitable halogenating agent, such as thionyl chloride.

Further in accordance with the invention, halogen-containing 2-acyloxybenzanilide compounds having Formula I are produced by the reaction of a halogen-containing 2-acyloxybenzoyl halide compound having the formula

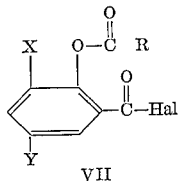
VII with an aniline compound having Formula V above in the presence of a base; where R, X, Y, and Hal have the aforementioned significance. Suitable bases for use in the reaction are tertiary amines, such as triethylamine, N,N-dimethylaniline, and N-ethylmorpholine, having a base strength greater than the aniline compound of Formula V. These bases are used in an amount at least sufficient to bind the hydrohalic acid liberated in the reaction. If desired, a molar excess or more of the aniline compound may be employed, in which case added base is not required. The reaction is advantageously carried out in an unreactive solvent medium. Suitable solvents include ethers, aliphatic and aromatic hydrocarbons, various chlorinated hydrocarbons, and other unreactive solvents, such as N,N-dimethylformamide and dimethylsulfoxide. The preferred solvent is benzene. The reaction may also be carried out in the presence of an excess of the base employed, in which case added solvent may be omitted. The temperature and duration of the reaction are not critical and may be varied over a wide range. At a temperature in the range of 70–80° C., the reaction is essentially complete in 1–2 hours.

The halogen-containing 2-acyloxybenzoyl halide compounds having Formula VII above, used as starting materials in the foregoing procedure, are prepared by reaction of a halogen-containing salicyclic acid compound having the formula

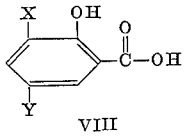
VIII with an acid halide having the formula

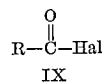
IX in an unreactive solvent, such as benzene, followed by reaction of the halogen-containing 2-acyloxybenzoic acid that is obtained, having the formula,

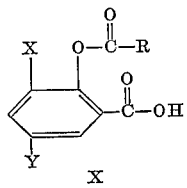
X with a halogenating agent, such as thionyl chloride; where R, X, Y, and Hal have the aforementioned significance.

The compounds of the invention are useful pharmacological agents. They are antiparasitic agents that are active against the trematode *Fasciola hepatica* and a variety of nematodes, for example, the nematode *Haemonchus contortus*. In this respect, the halogen-containing 2-acyloxybenzanilide compounds of the invention have been found to be as effective as the corresponding halogen-containing salicylanilide compounds. In contrast to the salicylanilide compounds, however, the compounds of the invention are non-irritating to the mucosa of warm-blooded animals and are less toxic, thus possessing higher therapeutic indices.

The invention is illustrated by the following examples:

EXAMPLE 1

To a stirred solution of 70 g. of 3,5-dibromo-4'-chlorosalicylanilide in 400 ml. of acetic anhydride at 50° C. is added 1.5 ml. of 96% sulfuric acid. The resulting mixture is kept at room temperature for 2 hours, then poured into 2000 ml. of water, and the aqueous mixture is stirred for 30 minutes. The insoluble solid 2-acetoxy-3,5-dibromo-4'-chlorobenzanilide obtained is isolated, washed with water, dried, and crystallized from ethanol; M.P. 182–182.5° C.

EXAMPLE 2

A solution of 10 g. of 3,4',5-tribromosalicylanilide in 30 ml. of acetic anhydride is heated under reflux for 2 hours. The reaction mixture is then poured into 200 ml. of hot water (70° C.), and the aqueous mixture is stirred for 30 minutes. The insoluble solid 2-acetoxy-3,4',5-tribromo-benzanilide obtained is isolated, washed with water, dried, and crystallized from benzene; M.P. 188–190° C.

EXAMPLE 3

A stirred solution of 59 g. of 3,4',5-triiodosalicylanilide in 300 ml. of acetic anhydride heated to 50° C. is treated with 0.5 ml. of concentrated sulfuric acid. The reaction mixture is then cooled to room temperature, stirred for 30 minutes, and the insoluble solid 2-acetoxy-3,4',5-triiodobenzanilide obtained is isolated, dried, and crystallized from acetone; M.P. 220–221° C.

By utilizing the foregoing procedure, the following halogen-containing 2-acetoxybenzanilide compounds are prepared by reaction of the designated halogen-containing salicylanilide compound and acetic anhydride:

(a) From the reaction of 50 g. of 4'-chloro-3,5-diiodosalicylanilide there is obtained 2-acetoxy-4'-chloro-3,5-diiodobenzanilide, M.P. 213–214° C., after crystallization from acetone.

(b) From the reaction of 54.4 g. of 4'-bromo-3,5-diiodosalicylanilide there is obtained 2-acetoxy-4'-bromo-3,5-diiodobenzanilide, M.P. 221° C., after crystallization from benzene-petroleum ether.

The preparation of the halogen-containing salicylanilide compounds used as starting materials in the foregoing procedure can be illustrated by the preparation of 3,4',5-triiodosalicylanilide according to the following procedure.

To a solution of 9 g. of p-iodoaniline in 50 ml. of benzene is added a solution of 8 g. of 3,5-diiodosalicylyl chloride in 25 ml. of benzene, and the resulting mixture is heated at 60–65° C. for one hour. After cooling, the mixture is filtered to remove p-iodoaniline hydrochloride, and the filtrate is evaporated to dryness under reduced pressure. The solid 3,4',5-triiodosalicylanilide obtained is crystallized from acetone; M.P. 244–248° C.

In a similar manner, the following halogen-containing salicylanilide compounds are obtained from the reaction of the appropriate salicylyl chloride compound and substituted aniline:

(a) 4'-chloro-3,5-diiodosalicylanilide, M.P. 202° C.
(b) 4'-bromo-3,5-diiodosalicylanilide, M.P. 220° C.

EXAMPLE 4

A stirred solution of 50 g. of 4',5-dibromo-3-iodosalicylanilide in 300 ml. of acetic anhydride heated to 50° C. is treated with 0.5 ml. of concentrated sulfuric acid. The reaction mixture is then cooled to room temperature, stirred for 30 minutes, and the insoluble solid 2-acetoxy-4',5-dibromo-3-iodobenzanilide obtained is isolated, dried, and crystallized from acetone-water; M.P. 204° C.

In a similar manner, with the substitution of 50 g. of 3,4'-dibromo-5-iodosalicylanilide for the 4',5-dibromo-3-iodosalicylanilide in the foregoing procedure, there is obtained 2-acetoxy-3,4'-dibromo-5-iodobenzanilide.

The 4',5-dibromo-3-iodosalicylanilide used as starting material in the foregoing procedure is prepared according to the following procedure.

To a solution of 51 g. of 5-bromo-2-acetoxybenzoic acid in 500 ml. of glacial acetic acid heated to 50° C. is added, in portions, 35 g. of iodine monochloride, and the resulting mixture is kept at 50° C. for one hour more. Sufficient sodium sulfite solution is added to decolorize the mixture, and most of the solvent is removed by distillation under reduced pressure. The distillation residue is cooled, and the solid 2-acetoxy-5-bromo-3-iodobenzoic acid obtained is isolated and crystallized twice from aqueous acetic acid; M.P. 225–226° C.

To a refluxing solution of 38 g. of 2-acetoxy-5-bromo-3-iodobenzoic acid and 19 g. of p-bromoaniline in 320 ml. of xylene is added dropwise 5 g. of phosphorus trichloride. The resulting mixture is heated under reflux for an additional two hours, and the hot xylene solution is then decanted from the viscous precipitate that is formed. Upon cooling of the xylene solution, there is obtained solid 4',5-dibromo-3-iodosalicylanilide; M.P. 218–219° C., after crystallization from aqueous N,N-dimethylformamide.

The isomeric 3,4'-dibromo-5-iodosalicylanilide is prepared in an analogous manner starting from 3-bromo-2-acetoxybenzoic acid.

EXAMPLE 5

To a stirred solution of 10 g. of 3,4',5-tribromosalicylanilide in 50 ml. of propionic anhydride heated to 50° C. is added 0.5 ml. of concentrated sulfuric acid, and the resulting mixture is stirred and heated at 50° C. for two hours. The mixture is then poured into 300 ml. of hot water (70° C.), and the aqueous mixture is stirred for 30 minutes. The insoluble 2-propionoxy-3,4',5-tribromobenzanilide obtained is isolated, washed with water, dried, and crystallized from benzene.

EXAMPLE 6

A solution of 5.0 g. of 3,4',5-tribromosalicylanilide in 20 ml. of isobutyric anhydride is heated at 150° C. for 30 minutes. Upon cooling, the excess isobutyric anhydride is evaporated under reduced pressure, and the solid residue of 2 - isobutyryloxy - 3,4',5 - tribromobenzanilide obtained is crystallized from acetic acid; M.P. 146–147° C.

EXAMPLE 7

To a solution of 10 g. of 3,4',5-tribromosalicylanilide in a mixture of 50 ml. of benzene and 50 ml. of pyridine is added a solution of 3.0 g. of n-hexanoyl chloride in 25 ml. of benzene, and the resulting mixture is heated under reflux for one hour. The mixture is allowed to cool, and the solid precipitate of 2-hexanoyloxy-3,4',5-tribromobenzanilide that is obtained is isolated, stirred well with 200 ml. of 1 N hydrochloric acid, isolated again, washed with 1 N hydrochloric acid, then with water, dried, and crystallized from aqueous N,N-dimethylformamide.

By utilizing the foregoing procedure, with the substitution of 6.0 g. of palmitoyl chloride for the hexanoyl chloride, there is obtained 2-palmitoyloxy-3,4',5-trimbromobenzanilide.

EXAMPLE 8

Pyridine (1.6 g.) is added dropwise with stirring to 3.5 g. of cyclohexanecarboxylic acid chloride maintained at 0° C. to the resulting white, granular complex is added a solution of 9 g. of 3,4'5-tribromosalicylanilide in 200 ml. of dioxane, and the mixture is stirred overnight at room temperature. The insoluble pyridine hydrochloride is removed by filtration, and the filtrate is evaporated to dryness under reduced pressure. The solid residue of 2-cyclohexanecarboxy-3,4',5-tribromobenzanilide obtained is crystallized twice from acetic acid; M.P. 195–196° C.

By utilizing the foregoing procedure, the following halogen-containing 2-acyloxybenzanilide compounds are prepared by reaction of 3,4',5-tribromosalicylanilide and the specified carboxylic acid chloride compound:

(a) From reaction with cyclopropanecarboxylic acid chloride, there is obtained 2-cyclopropanecarboxy-3,4',5-tribromobenzanilide; M.P. 172–173° C., following crystallization from acetic acid.

(b) From reaction with 3-cyclopentylpropionyl chloride, there is obtained 2-(3-cyclopentylpropionoxy)-3,4',5-tribromobenzanilide; M.P. 134–136° C., following crystallization from methanol.

EXAMPLE 9

A mixture consisting of 43.2 g., of 2-acetoxy-3,5-diiodobenzoic acid and 200 ml. of thionyl chloride is heated under reflux for 30 minutes. The excess thionyl chloride is evaporated under reduced pressure and the residue of 2-acetoxy-3,5-diiodobenzoyl chloride is dissolved in 200 ml. of benzene. The benzene solution is then added to a solution of 34.4 g. of p-bromoaniline in 100 ml. of benzene, and the resulting mixture is heated under reflux for one hour. The cooled mixture is filtered to remove p-bromoaniline hydrochloride, and the filtrate is washed, first with cold, dilute hydrochloric acid, then with water, and dried. The dried solution is then evaporated to dryness, and the solid 2-acetoxy-4'bromo-3,5-diiodobenzanilide obtained is isolated and crystallized from benzene; M.P. 221° C.

EXAMPLE 10

A mixture consisting of 35.6 g. of acetoxy-3,5-dibromobenzoic acid chloride, 25.5 g. of p-chloroaniline and 300 ml. of benzene is heated under reflux for one hour. The cooled mixture is filtered to remove p-chloroaniline hydrochloride, and the filtrate is washed, first with cold, dilute hydrochloric acid, then with water, and dried. The dried solution is then evaporated to dryness, and the solid 2-acetoxy-3,5-dibromo-4'-chlorobenzanilide obtained is isolated and crystallized from ethanol; M.P. 182–182.5° C.

By utilizing the foregoing procedure, the following halogen-containing 2-acetoxybenzanilide compounds can be prepared by reaction of 2-acetoxy-3,5-dibromobenzoic acid chloride with the designated aniline compound:

(a) From reaction with 44.3 g. of p-iodoaniline there is obtained 2-acetoxy-3,5-dibromo-4'-iodobenzanilide.

(b) From reaction with 30.2 g. of m-trifluoromethylaniline there is obtained 2-acetoxy-3,5-dibromo-3'-trifluoromethylbenzanilide.

What is claimed is:

1. A halogen-containing 2-acyloxybenzanilide compound, having the formula

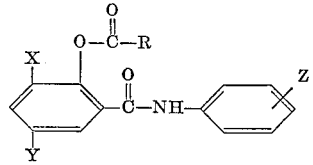

where R is a member of the class consisting of hydrogen, a straight-chain alkyl radical having from one to 17 carbon atoms, a branched-chain alkyl radical having from one to 17 carbon atoms, a cycloalkyl group having from 3 to 8 carbon atoms, and a cycloalkyl-substituted alkyl radical; each of X and Y is a member of the class consisting of bromine and iodine, and Z is a member of the class consisting of p-chloro, p-bromo, p-iodo, and m-trifluoromethyl.

2. A compound according to claim 1 wherein R is methyl, and X, Y, and Z are as defined in claim 1.

3. A compound according to claim 1 which is 2-acetoxy-3,4',5-tribromobenzanilide.

4. A compound according to claim 1 which is 2-acetoxy-3,5-dibromo-4'-chlorobenzanilide.

5. A compound according to claim 1 which is 2-acetoxy-4'-bromo-3,5-diiodobenzanilide.

6. A compound according to claim 1 which is 2-acetoxy-3,4',5-triiodobenzanilide.

7. A compound according to claim 1 which is 2-acetoxy-4'-chloro-3,5-diiodobenzanilide.

References Cited

UNITED STATES PATENTS 2,703,332   3/1955   Bindler et al. _____ 260—479

JAMES A. PATTEN, Primary Examiner

U.S. Cl. X.R.

260—410.5, 468, 559, 999